United States Patent
Toth et al.

(10) Patent No.: US 8,941,049 B2
(45) Date of Patent: Jan. 27, 2015

(54) READOUT METHODOLOGY FOR MULTI-CHANNEL ACQUISITION OF SPATIALLY DISTRIBUTED SIGNAL

(75) Inventors: Gabor Toth, San Jose, CA (US); Stuart Friedman, Palo Alto, CA (US); Khashayar Shadman, San Rafael, CA (US)

(73) Assignee: KLA-Tencor Corporation, Milpitas, CA (US)

(*) Notice: Subject to any disclaimer, the term of this patent is extended or adjusted under 35 U.S.C. 154(b) by 872 days.

(21) Appl. No.: 13/172,030

(22) Filed: Jun. 29, 2011

(65) Prior Publication Data

US 2012/0029854 A1 Feb. 2, 2012

Related U.S. Application Data

(60) Provisional application No. 61/369,634, filed on Jul. 30, 2010.

(51) Int. Cl.
*G06F 19/00* (2011.01)
*G01J 3/28* (2006.01)

(52) U.S. Cl.
CPC .................................. *G01J 3/2803* (2013.01)
USPC ..................... 250/226; 250/208.2; 250/252.1; 702/66; 702/189

(58) Field of Classification Search
CPC ..... G06K 9/00496; G06K 9/0051; G01J 3/36; G01J 3/44; G01J 3/2803
USPC ............ 250/226, 214 C, 214 R, 208.2, 208.3, 250/252.1; 356/300, 306, 307, 326; 702/66, 702/75, 76, 104, 189
See application file for complete search history.

(56) References Cited

U.S. PATENT DOCUMENTS

| | | | |
|---|---|---|---|
| 5,099,114 A | 3/1992 | Matsumoto et al. | |
| 6,373,050 B1 | 4/2002 | Pain et al. | |
| 6,377,300 B1 | 4/2002 | Morris et al. | |
| 6,885,827 B2* | 4/2005 | Shushakov et al. | 398/202 |
| 7,085,502 B2* | 8/2006 | Shushakov et al. | 398/202 |
| 7,233,870 B1* | 6/2007 | Dalrymple | 702/76 |
| 7,283,231 B2* | 10/2007 | Brady et al. | 356/326 |
| 7,427,932 B2* | 9/2008 | Brady et al. | 341/13 |
| 7,432,843 B2* | 10/2008 | Brady et al. | 341/155 |
| 7,463,174 B2* | 12/2008 | Brady et al. | 341/122 |
| 7,463,179 B2* | 12/2008 | Brady et al. | 341/155 |
| 7,532,772 B2* | 5/2009 | Brady | 382/299 |
| 7,616,306 B2* | 11/2009 | Brady et al. | 356/326 |
| 7,737,874 B1 | 6/2010 | Degtiarenko et al. | |
| 2002/0169574 A1 | 11/2002 | Jensen et al. | |
| 2004/0022538 A1* | 2/2004 | Shushakov et al. | 398/51 |
| 2005/0185266 A1* | 8/2005 | Shushakov et al. | 359/344 |
| 2008/0129568 A1* | 6/2008 | Brady et al. | 341/155 |
| 2012/0029854 A1* | 2/2012 | Toth et al. | 702/66 |
| 2013/0321802 A1* | 12/2013 | Imura | 356/306 |

* cited by examiner

*Primary Examiner* — John Lee
(74) *Attorney, Agent, or Firm* — Suiter Swantz pc llo

(57) ABSTRACT

A readout apparatus and method for processing spatially distributed signals is disclosed. The readout apparatus and method may reduce/eliminate the impact gain variations among a plurality of sensing channels. This is done by continuously varying the dispersion properties of a signal distribution device, which may induce a spatial shift of the signal distribution during data acquisition, allowing the distributed signals to move across the sensor area. Shifting of the distributed signals may occur multiple times, hence eliminating the impact of gain variation across the sensor array. The accumulated data may be re-assembled subsequently to complete the readout operation.

20 Claims, 6 Drawing Sheets

READOUT METHODOLOGY FOR MULTI-CHANNEL ACQUISITION OF SPATIALLY DISTRIBUTED SIGNAL

CROSS-REFERENCE TO RELATED APPLICATIONS

The present application claims the benefit under 35 U.S.C. §119(e) of U.S. Provisional Application Ser. No. 61/369,634, filed Jul. 30, 2010. Said U.S. Provisional Application Ser. No. 61/369,634 is hereby incorporated by reference in its entirety.

TECHNICAL FIELD

The disclosure generally relates to the field of signal processing, particularly to a readout method for multi-channel, parallel data stream representing a spatially distributed signal.

BACKGROUND

Various devices may be utilized to separate a signal (e.g., an optical signal, an electrical signal or the like) and spatially distribute the separated signals across a readout mechanism, allowing the readout mechanism to read the distributed signals in a parallel fashion. For instance, chromatic dispersion may provide spatial separation of an optical signal, and an array of sensors distributed along the dispersed electron positions may be utilized to collect the spatially distributed signals at their respective positions substantially in parallel.

Conventional devices for reading such spatially distributed signals may fixedly associate the spatially distributed signals to their respective sensors. However, not all sensors in the sensor array behave exactly identical with respect to each other. For instance, sensitivities of the sensors may vary, creating gain variations among these sensors. Such variations and often poorly calibratable gain channels on the sensors may present one of the disadvantages of the conventional parallel readout devices, and may lead to spectrum artifacts on the collected data. Therein lies a need for eliminating the impact of sensor gain variations.

SUMMARY

The present disclosure is directed to an apparatus for processing an input signal. The apparatus may reduce/eliminate the impact of all types of gain variations among a plurality of sensing channels. The apparatus may include a signal distribution device configured for receiving the input signal and spatially distributing the input signal as a plurality of distributed signals. The signal distribution device is further configured for changing the spatial distribution of the plurality of distributed signals according to a deterministic distribution function when time advances from one time instance to a next time instance. The apparatus may also include a sensor array configured for receiving at least a subset of the plurality of distributed signals at each time instance. The sensor array is further configured for converting the received distributed signals to electrical signals for each time instance. The apparatus may further include a signal processor communicatively connected to the sensor array. The signal processor is configured for receiving the electrical signals for each time instance and determining an intensity value of at least one of the plurality of distributed signals based on the electrical signals received from the sensor array and the deterministic distribution function utilized for spatial distribution for different time instances.

A further embodiment of the present disclosure is directed to a method for processing an input signal. The method may include separating the input signal into a plurality of separated signals; spatially distributing the plurality of separated signals as a first spectrum of signals at a first time instance; converting at least a subset of the first spectrum of signals to electrical signals for the first time instance; spatially distributing the plurality of separated signals as a second spectrum of signals at a second time instance, the second spectrum of signals differs from the first spectrum of signals; converting at least a subset of the second spectrum of signals to electrical signals for the second time instance; and determining an intensity value for at least one of the plurality of separated signals based on the electrical signals obtained for the first time instance and the electrical signals obtained for the second time instance.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Figure 1:
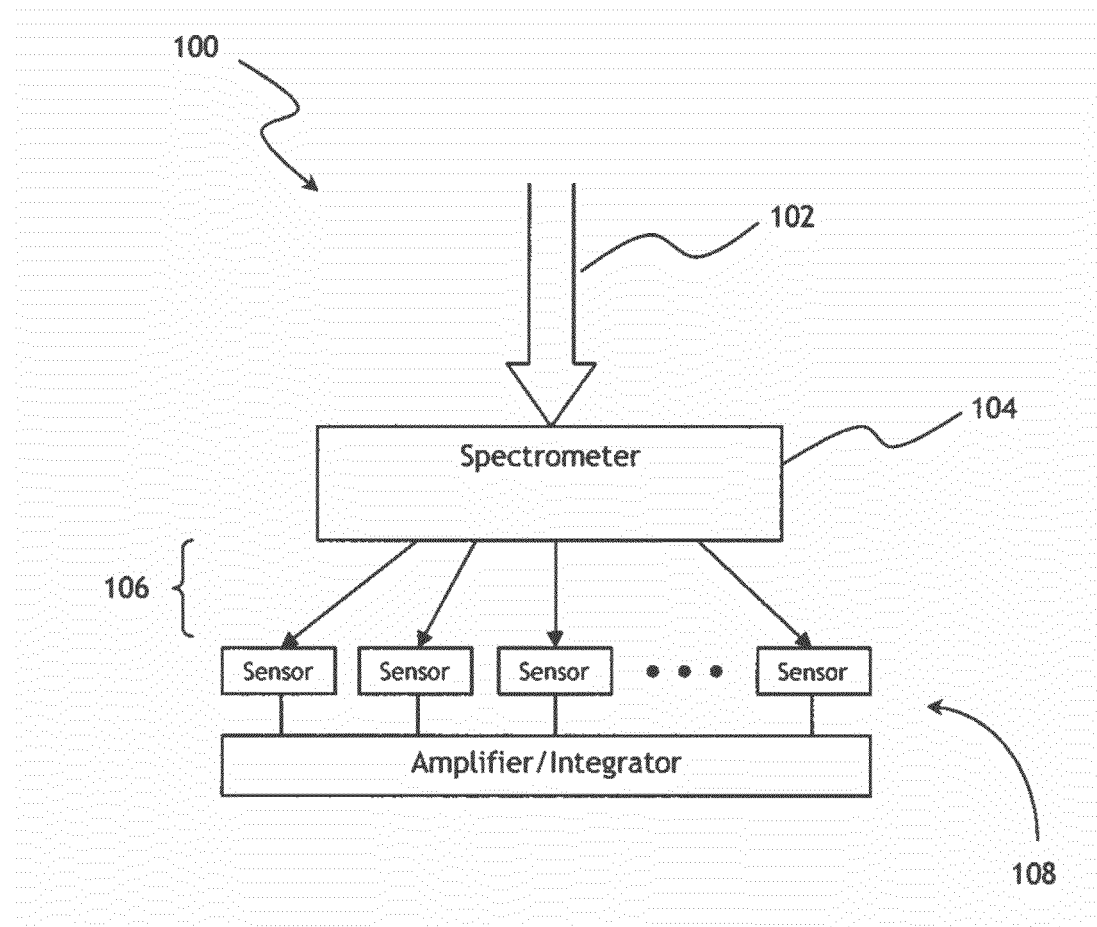
FIG. 1 is a block diagram illustrating a readout mechanism.

FIG. 1 is a block diagram illustrating a conventional parallel readout mechanism 100. A spectrometer 104 may be utilized to separate an input signal 102 (e.g., an optical signal) and spatially distribute the separated signals/channels 106 across a readout mechanism 108. The readout mechanism 108 may include a sensor array having multiple sensors configured to read the distributed signals/channels 106 in a parallel fashion.

One of the disadvantages of a conventional readout mechanism 100 is the varying and often poorly calibratable gain channels on each sensor. Sensitivities of the sensors may vary, thus creating gain variations among these sensors. In addition, the gain of the sensor array may change over time due to various reasons such as ageing, contamination or the like. Such variations/changes may affect the data collected by the readout mechanism 108 (e.g., may lead to spectrum artifacts on the collected data). Therefore, a readout device that eliminates the impact of gain variations is appreciated.

The present disclosure is directed to a parallel readout apparatus and method that reduces/eliminates the impact of all types of gain variations among the parallel sensing channels. Such gain variations may be reduced/eliminated even if they change over time. This is done by continuously varying the dispersion properties of the signal distribution device (e.g., the spectrometer). For instance, the signal distribution device in accordance with the present disclosure may be configured to induce a spatial shift of the signal distribution during data acquisition, allowing the distributed signals to move across the sensor area. Shifting of the distributed signals may occur as many times as the number of sensors (as an example), and in this manner every sensor may accumulate signal from every channel at least once, hence eliminating the impact of gain variation across the sensor array. The accumulated data may be re-assembled subsequently to complete the readout operation.

Examples are provided to illustrate the system and method of the present disclosure in detail. While the examples are explained in the context of processing optical signals, it is contemplated that various other types of input signals may be processed without departing from the spirit and scope of the present disclosure.

Figure 2:
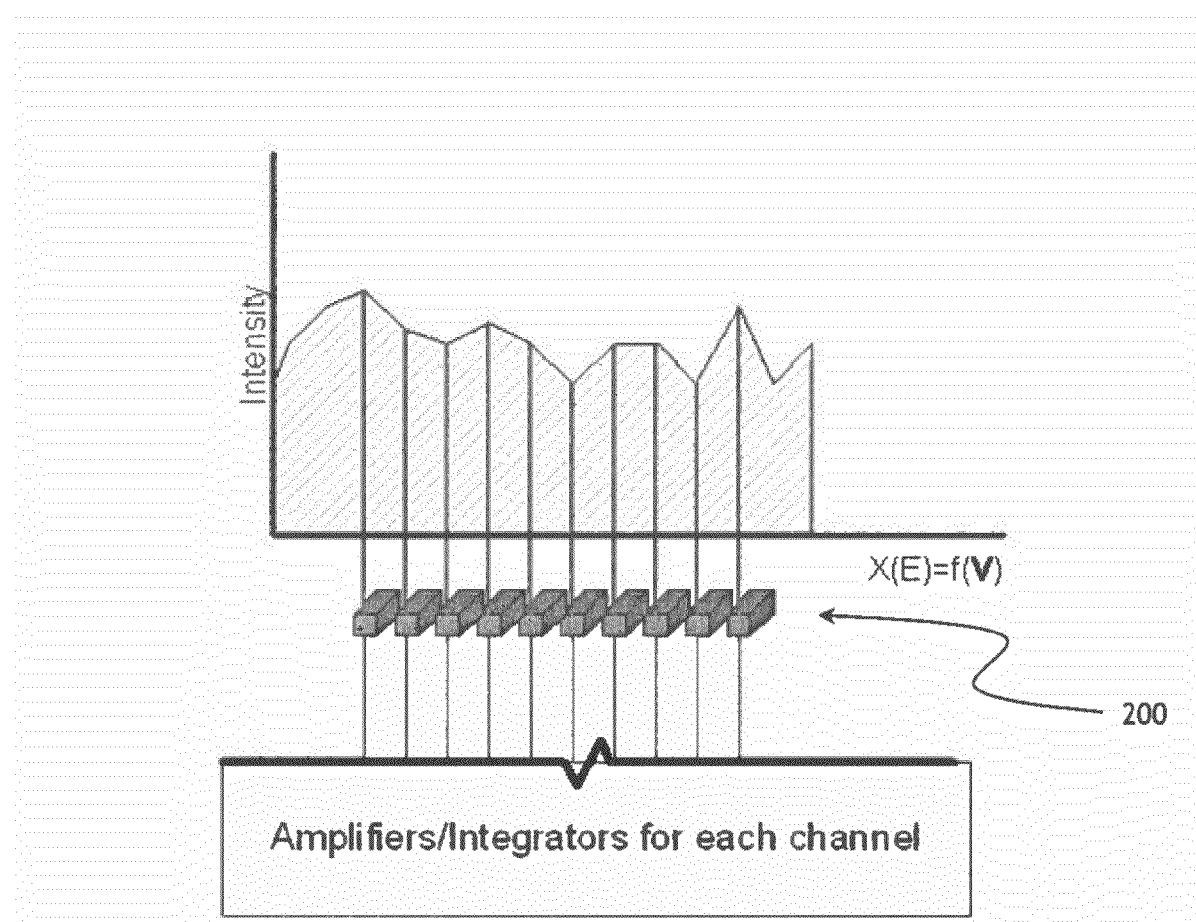
FIG. 2 is an illustration depicting a relationship between a plurality of spatially distributed signals and a sensor array.

For instance, a spectrometer may be utilized as a signal distribution device to obtain spatially distributed optical signal and convert it into a plurality of distributed electrical signals (may also be referred to as a plurality of channels). Similarly, electrons with various energy levels may be distributed to various locations based on the dispersion characteristics of the spectrometer. Referring to FIG. 2, an illustration depicting positions of electrons with different energies distributed over a sensor array 200 is shown. It is noted that the sensor array 200 is not required to sample all of the distributed electrons. That is, as illustrated in FIG. 2, the spectrum of the distributed electrons may extend to both smaller and/or larger energy levels, but only a portion (e.g., a certain percentage) of the spectrum may need to be sampled by the sensor array 200 (ten sensors shown in FIG. 2 as an example). However, it is contemplated that the sensor array 200 may sample the entire spectrum of the distributed electrons or any portions of the spectrum without departing from the spirit and scope of the present disclosure.

Let f(V) represent the dispersion function of the spectrometer, where V is a set of parameters that may determining the dispersion characteristics of the spectrometer. Furthermore, let x(E) represent the position of the electron with energy E distributed with respect to the sensor array 200. The relationship between x(E) and f(V), i.e., x(E)=f(V), indicates that electrons with certain energy is distributed to certain spatial location based on the given dispersion characteristics of the spectrometer.

In a conventional system, the dispersion characteristics of the spectrometer remains fixed/unchanged. That is, upon receiving an input signal, a conventional spectrometer may spatially distribute the input signal into a plurality of distributed electrons in the same manner for the entire duration that the input signal is been received. Therefore, the particular sensor that receives the electron with energy E, at position x(E), also remains fixed/unchanged for the entire duration. Fixedly associating the spatially distributed signals to the sensors may be disadvantageous for the reasons aforementioned.

The apparatus and method in accordance with the present disclosure may continuously change the parameter set V so that the spectrum of the distributed signals moves with respect to the sensor array in a deterministic manner. Therefore, instead of utilizing a spectrometer having fixed dispersion characteristics, the spectrometer in accordance with the present disclosure may change the distribution of the distributed electrons according to a deterministic distribution function when time advances from one time instance to the next. That is, the set of parameters V, which determines the dispersion characteristics of the spectrometer, may be configured to be time-dependent. For instance, V may be defined as a function of time t so that f(V(t|Δt)) f(V(t)) is a constant. In this manner, the spectrum of the distributed electrons may shift a predetermined amount over the sensor array as a rigid body, as shown in FIG. 3.

Figure 3:
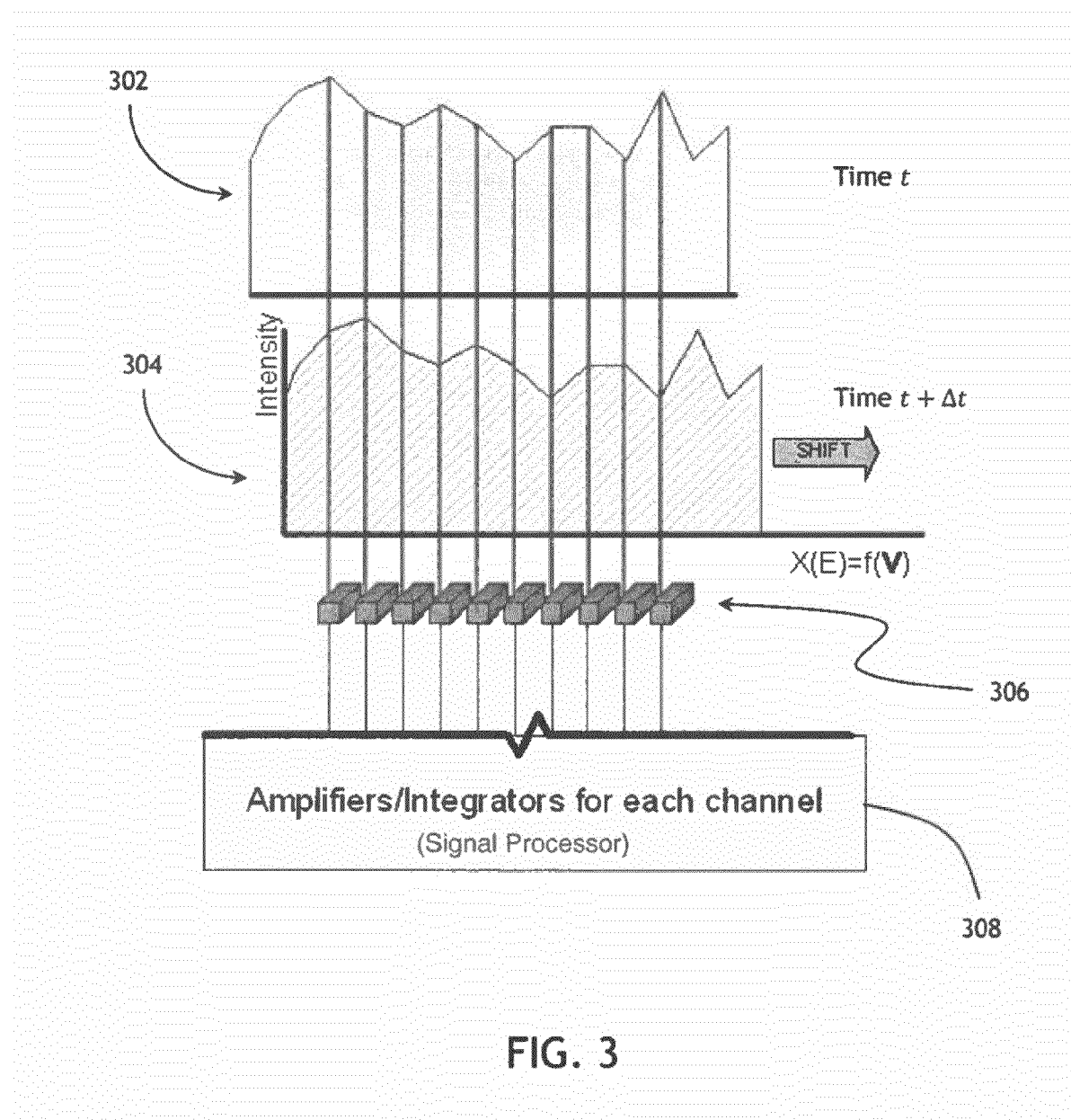
FIG. 3 is an illustration depicting a shift of a plurality of spatially distributed signals with respect to a sensor array.

As illustrated in FIG. 3, suppose that the spectrometer distributes the electrons over the sensor array 306 in the manner as indicated by the exemplary spectrum 302 at time t. At least a portion of the spectrum 302 may be received by the sensor array 306. The sensor array 306 may include a plurality of sensors (e.g., anodes), wherein each sensor may then convert the electrons it has received to electrical signals and provide the electrical signals to a signal processor 308. This process may be referred to as a readout, and the signal processor 308 may record the electrical signals from each sensor as well as the time that the readout is performed (i.e., time t).

As described above, the spectrometer is configured to change the distribution of the electrons according to a deterministic distribution function as time advances. In one embodiment, the deterministic distribution function may be configured to shift the spectrum 302 a predetermined amount over the sensor array 306 as time advances. For instance, the spectrum may be shifted one sensor position to the right (with respect to the orientation depicted in FIG. 3) every Δt time unit. This is depicted in FIG. 3, where the spectrum 302 is shifted to the right, and is indicated as spectrum 304 at time t+Δt.

At least a portion of the spectrum 304 may be received by the sensor array 306. Each sensor in the sensor array 306 may convert the electrons it has received to electrical signals and provide the electrical signals to the signal processor 308. The signal processor 308 may record the electrical signals from each sensor and the time that this readout is performed (i.e., time t+Δt). It is noted that the distribution of the electrons may continue to change (shift in the present example) according to the deterministic distribution function as time advances, and the signal processor 308 may continue to record the electrical signals from the sensor array 306 as well as the timing information.

The signal processor 308 may assemble the electrical signals received from the sensors based on the timing information. For instance, in a simplified example where the spectrum shifts one sensor pitch every units of time and the sensor array is read out in time intervals separated by Δt, the intensity value $I_i$ of the $i^{th}$ channel of the spectrum may be assembled according to the formula:

$$I_i = \sum_{j=i}^{i+N} I_j$$

where N is the total number of readouts (shifts) that the $i^{th}$ channel is received by the sensor array; j is the index of the particular sensor at which the $i^{th}$ channel is received at the $j^{th}$ readout; and $I_j$ is the intensity value (e.g., the converted electrical signal) reported by that particular sensor at the $j^{th}$ readout.

This simplified example illustrates the basic process in accordance with the present disclosure. That is, a given energy spectrum is moved through a sensor array, the sensor array performs readout operations utilizing every sensor element as the energy spectrum moves through, and the readout signals may then be assembled based on the signals received from the sensor array and the timing information associated with each readout operation. Even though the same channel may be received at different sensor at different times, since the dispersion characteristics of the spectrometer changes according to a deterministic distribution function based on time, the timing information associated with each readout operation allows the signal processor 308 to assemble the signals without data loss. Furthermore, since the readout operations occur at every sensor/channel simultaneously, the readout process in accordance with the present disclosure may still be performed in a substantially parallel manner.

It is understood that the example illustrated above is merely exemplary. Various other deterministic distribution functions may be utilized to change the spatial distribution of the electrons when time advances from one time instance/frame to the next. In addition, the readout time is not required to be associated with the rate at which spectrum shift occurs. Furthermore, various techniques may be utilized to implement the distribution changes. For example, the spectrometer may utilize intensity modulation techniques to shift the spectrum with respect to the sensor array. In another example, it is conceivable that instead of changing spectrometer properties, actual physical motion may be utilized to achieve relative displacement between the signal pattern and sensor array. It is contemplated that other techniques may also be utilized without departing from the spirit and scope of the present disclosure.

Figure 4:
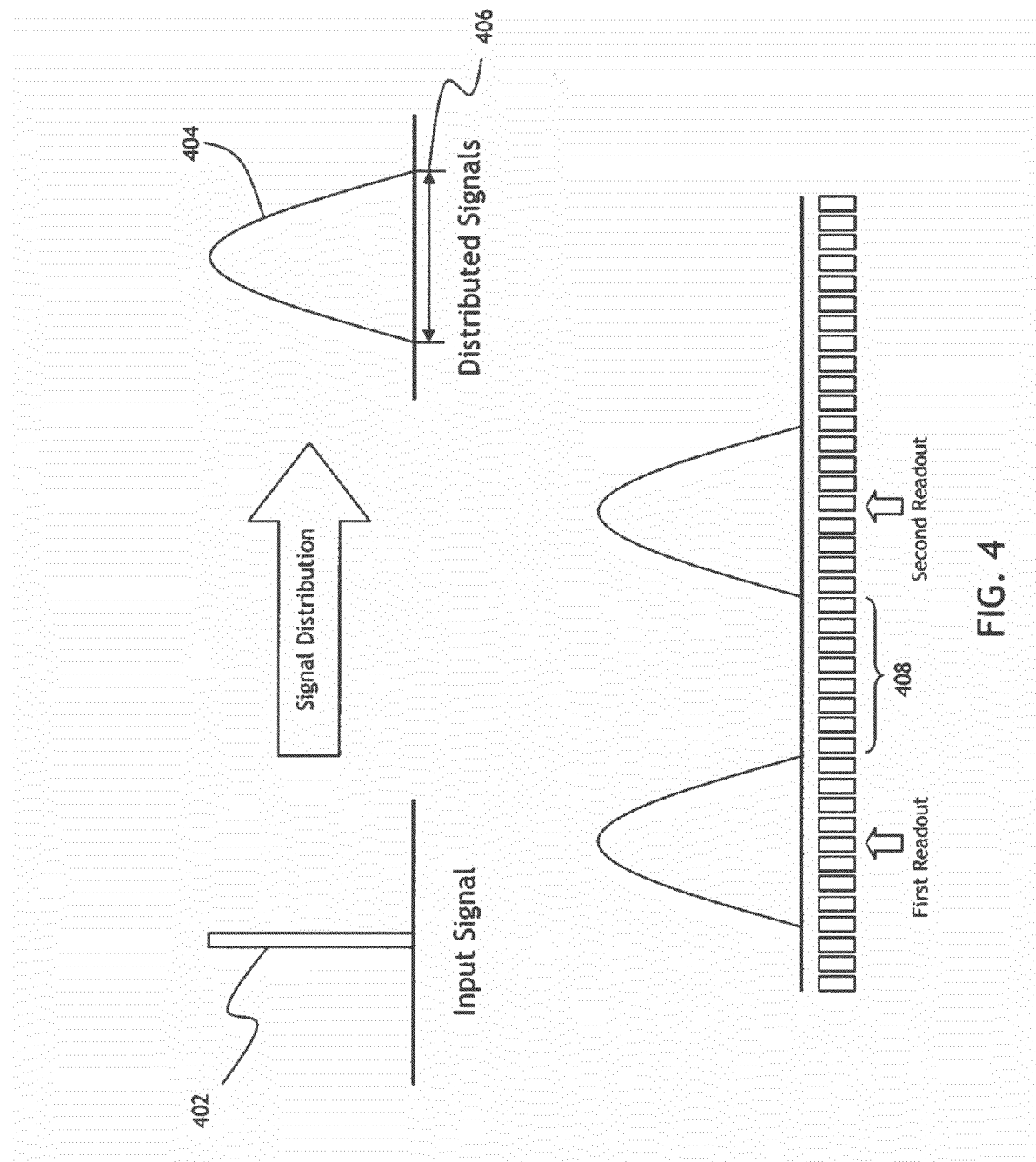
FIG. 4 is an illustration depicting a relationship between the amount of displacement of the distributed signals and the distribution resolution of a signal distribution device.

It may be appreciated that the distance of which the spectrum is shifted between two consecutive readouts is smaller than the actual energy resolution of the spectrometer. As illustrated in FIG. 4, an input signal 402 may be sent through a spectrometer, which may separate the input signal 402 into distributed signals 404. The spectrometer may have an inherent resolution so the width/resolution 406 of the distributed signals 404 may be finite. If the distributed signals 404 are shifted too much between two consecutive readouts, certain sensors/anodes 408 may be skipped. While the signal processor may still be able to assemble the signals, it is noted that the sensor array may be underutilized. Therefore, it may be appreciated (though not required) that the distance of which the spectrum is shifted between two consecutive readouts is smaller than the actual energy resolution of the spectrometer.

It is also understood that a spectrometer is merely one exemplary device that may be utilized to spatially distribute an input signal. Various types of dispersive optics or signal distribution devices may be utilized to distribute the input signal without departing from the spirit and scope of the present disclosure. Furthermore, readout of spatially distributed optical (photon) signals may be performed in the manner in accordance with the present disclosure.

Figure 5:
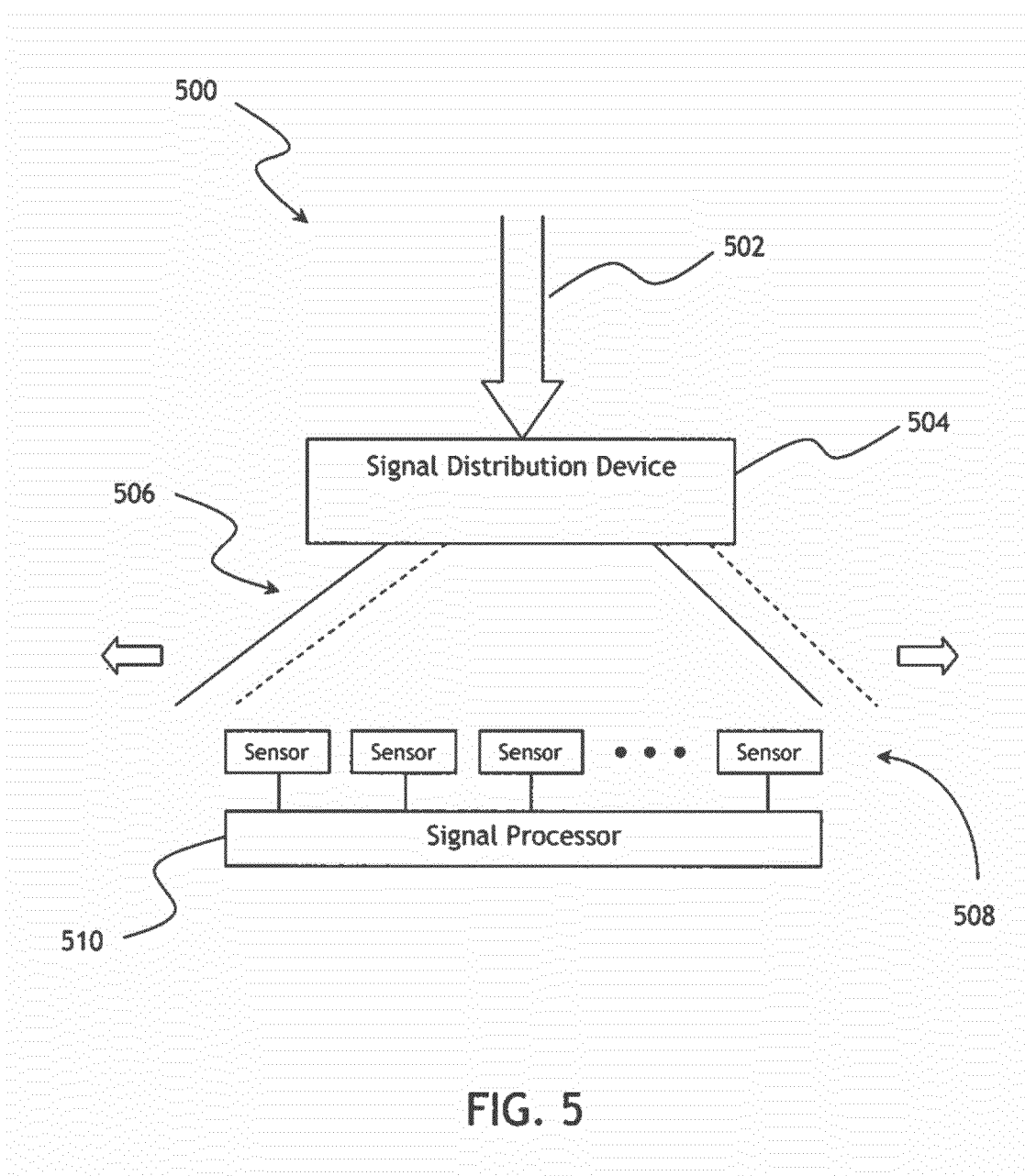
FIG. 5 is a block diagram illustrating a readout mechanism in accordance with the present disclosure.

FIG. 5 is a block diagram illustrating an apparatus 500 for processing an input signal in accordance with the present disclosure. In one embodiment, a signal distribution device 504 may receive the input signal 502 (e.g., an optical signal, an electrical signal or the like) and spatially distributing the input signal as a plurality of distributed signals 506. A sensor array 508 may receive at least a subset of the plurality of distributed signals and convert the received distributed signals to electrical signals. The electrical signals may be received and recorded by the signal processor 510.

The signal distribution device 504 is configured to change the spatial distribution of the distributed signals 506 according to a deterministic distribution function when time advances. For instance, the signal distribution device 504 may shift the distributed signals 506 for a predetermined amount when the time advances from t to t+Δt. The sensor array 508 may receive at least a subset of the distributed signals at time t+Δt and convert the received distributed signals to electrical signals. The electrical signals from time t+Δt may also be received and recorded by the signal processor 510. The signal distribution device 504 may continue changing the distribution of the distributed signals 506 according to the deterministic distribution function when time advances, and the signal processor 510 may assemble the signals received from the sensor array based on the timing information and the deterministic distribution function as described above.

In one embodiment, the signal distribution device 504 may be configured to change the spatial distribution of the distributed signals 506 utilizing intensity modulation techniques. Such techniques may allow the signal distribution device 504 to shift the distributed signals 506 with respect to the sensor array 508 in one direction, the opposite direction, or back and forth one or more times. The sensor array 508 may be read out as many times as the number of sensors, in this manner, every sensor may receive signal from every channel at least one, hence eliminating the impact of gain variation across the sensor array and no gain calibration is required. Furthermore, even if the gain of the sensor array changes over time (e.g., due to ageing, contamination or the like), such changes will not affect the output of the apparatus in accordance with the present disclosure.

Figure 6:
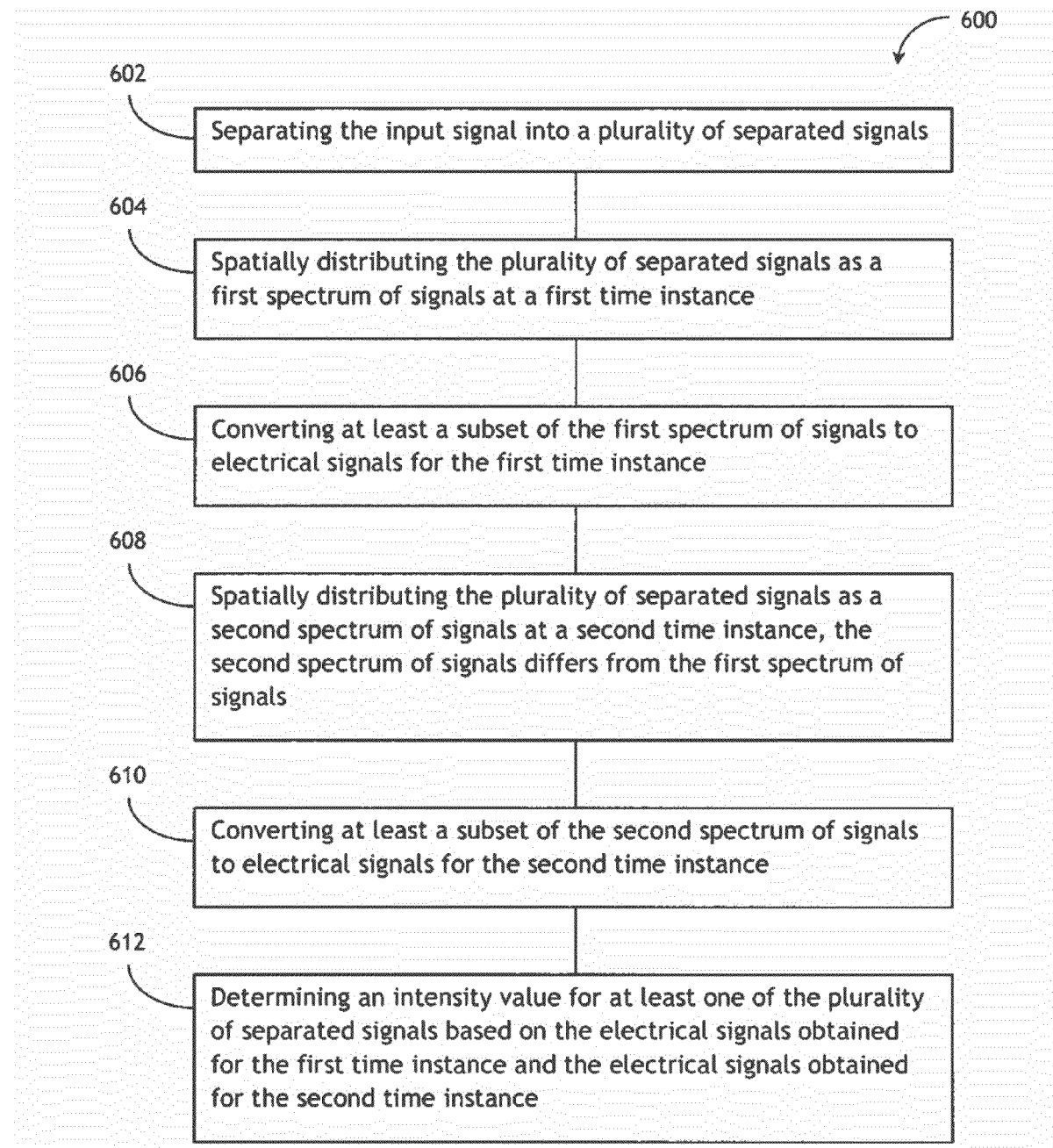
FIG. 6 is a flow diagram illustrating a method for processing an input signal in accordance with the present disclosure.

Referring to FIG. 6, a method 600 for processing an input signal is shown. The input signal may be an optical signal, an electrical signal, an electro-optical signal or the like. The input signal may be separated into a plurality of separated signals in step 602 based on their energy levels. Step 604 may spatially distribute the separated signals as a spectrum of signals, and at least a portion of which may be received and converted to electrical signals in step 606.

Subsequently, as time advances from a first time instance to the next, distribution of the signals may change as previously described. In one embodiment, step 608 may distribute the separated signals as a second spectrum of signals, which differs from the first mentioned spectrum of signals provided in step 604. For instance, the second spectrum of signals may be shifted a predetermined amount from the first spectrum of signals. In another example, the signals in the second spectrum may be rearranged partially or entirely compared to the signals in the first spectrum. It is contemplated that various techniques may be utilized to change the distribution of the separated signals, as long as the change from one time instance to the next is performed in a deterministic manner. It is also contemplated that the change of the signal distribution is not required to be in a discrete, step-size fashion. That is, the change of the signal distribution may be carried out in one continuous motion, and as long as the readout time is shorter than the change of the signal distribution, the exact same result can be achieved.

Step 610 may then received and converted at least a portion of the second spectrum of signals to electrical signals. Step 612 may determine the intensity value for one or more separated signals based on the electrical signals obtained from the first time instance (e.g., from step 606) and the electrical signals obtained from the second time instance (e.g., from step 610), as previously described.

It is noted that the two time instances depicted in method 600 are merely exemplary. The distribution of the signals may change multiple times and multiple readout operations may be performed without departing from the spirit and scope of the present disclosure. In one embodiment, the distribution may be changed (with respect to the sensor array at each readout operation) as many times as the number of sensors (or more) to eliminate/reduce the impact of gain variation across the sensor array. It is understood, however, that the specific number of times that the distribution is changed is not necessarily determined by the number of sensors. The distribution may change any sufficient number of times as long as such changes help eliminating/reducing gain variations.

It is to be understood that the present disclosure may be implemented in forms of a software/firmware package. Such a package may be a computer program product which employs a computer-readable storage medium/device including stored computer code which is used to program a computer to perform the disclosed function and process of the present disclosure. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

The methods disclosed may be implemented as sets of instructions, through a single production device, and/or through multiple production devices. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the disclosure. The accompanying method claims present elements of the various steps in a sample order, and are not necessarily meant to be limited to the specific order or hierarchy presented.

It is believed that the system and method of the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory.

What is claimed is:

1. An apparatus for processing an input signal, the apparatus comprising:
   a signal distribution device configured for receiving the input signal and spatially distributing the input signal as a plurality of distributed signals, the signal distribution device further configured for changing the spatial distribution of the plurality of distributed signals according to a deterministic distribution function when time advances from one time instance to a next time instance;
   a sensor array configured for receiving at least a subset of the plurality of distributed signals at each time instance, the sensor array further configured for converting the received distributed signals to electrical signals for each time instance; and
   a signal processor communicatively connected to the sensor array, the signal processor configured for receiving the electrical signals for each time instance, the signal processor further configured for determining an intensity value of at least one of the plurality of distributed signals based on the electrical signals received from the sensor array and the deterministic distribution function utilized for spatial distribution for different time instances.

2. The apparatus of claim 1, wherein the input signal includes an optical signal, the signal distribution device includes a spectrometer, and the plurality of distributed signals includes a plurality of distributed electrons with different energy levels.

3. The apparatus of claim 2, wherein the sensor array includes a plurality of spatially distributed anodes.

4. The apparatus of claim 1, wherein the signal distribution device is configured for changing the spatial distribution of the plurality of distributed signals utilizing intensity modulation.

5. The apparatus of claim 1, wherein the deterministic distribution function is configured for shifting the plurality of distributed signals for a predetermined amount when time advances from one time instance to the next.

6. The apparatus of claim 5, wherein the predetermined amount is smaller than or equal to a distribution resolution of the signal distribution device.

7. The apparatus of claim 5, wherein the plurality of distributed signals is shiftable in at least one of: a given direction, or a direction opposite to the given direction.

8. A method for processing an input signal, the method comprising:
   separating the input signal into a plurality of separated signals;
   spatially distributing the plurality of separated signals as a first spectrum of signals at a first time instance;
   converting at least a subset of the first spectrum of signals to electrical signals for the first time instance;
   spatially distributing the plurality of separated signals as a second spectrum of signals at a second time instance, the second spectrum of signals being shifted from the first spectrum of signals;
   converting at least a subset of the second spectrum of signals to electrical signals for the second time instance; and
   determining an intensity value for at least one of the plurality of separated signals based on the electrical signals obtained for the first time instance and the electrical signals obtained for the second time instance.

9. The method of claim 8, wherein the input signal includes an optical signal, and the optical signal is separated and spatially distributed utilizing a spectrometer.

10. The method of claim 9, wherein the spectrometer is configured for changing the spatial distribution of the plurality of separated signals utilizing intensity modulation when time advances from the first time instance to the second time instance.

11. The method of claim 10, wherein the second spectrum of signals is the first spectrum of signals shifted by a predetermined amount.

12. The method of claim 11, wherein the predetermined amount is smaller than or equal to a distribution resolution of the spectrometer.

13. An apparatus for reading an optical signal, the apparatus comprising:
   a spectrometer configured for receiving the optical signal and spatially distributing the optical signal as a plurality of distributed electrons, the spectrometer further configured for changing the spatial distribution of the plurality of distributed electrons according to a deterministic distribution function when time advances from one time instance to a next time instance;
   a sensor array configured for receiving at least a subset of the plurality of distributed electrons at each time instance, the sensor array further configured for converting the received distributed electrons to electrical signals for each time instance; and
   a signal processor communicatively connected to the sensor array, the signal processor configured for receiving the electrical signals for each time instance, the signal processor further configured for determining an intensity value of at least one of the plurality of distributed electrons based on the electrical signals received from the sensor array and the deterministic distribution function utilized for spatial distribution for different time instances.

14. The apparatus of claim 13, wherein the spectrometer spatially distributes the plurality of distributed electrons based on an energy level associated with each of the plurality of distributed electrons.

15. The apparatus of claim 13, wherein the sensor array includes a plurality of spatially distributed anodes.

16. The apparatus of claim 13, wherein the spectrometer is configured for changing the spatial distribution of the plurality of distributed electrons utilizing intensity modulation.

17. The apparatus of claim 13, wherein the deterministic distribution function is configured for shifting the plurality of distributed electrons for a predetermined amount when time advances from one time instance to the next.

18. The apparatus of claim 17, wherein the predetermined amount is smaller than or equal to a distribution resolution of the spectrometer.

19. The apparatus of claim 17, wherein the plurality of distributed electrons is shiftable in at least one of: a given direction, or a direction opposite to the given direction.

20. The apparatus of claim 17, wherein the plurality of distributed electrons is shifted at least as many time as the number of anodes included in the sensor array.

* * * * *